US012695281B2

(12) United States Patent
Cieszyński et al.

(10) Patent No.: US 12,695,281 B2
(45) Date of Patent: Jul. 28, 2026

(54) CABLE SLEEVE COMPRISING A DEFORMABLE PORTION WITH VARIABLE CROSS-SECTIONAL AREA

(71) Applicant: APTIV MANUFACTURING MANAGEMENT SERVICES GMBH, Schaffhausen (CH)

(72) Inventors: Michał Cieszyński, Cracow (PL); Tomasz Ślizowski, Cracow (PL); Wojciech Leśniak, Cracow (PL); Marek Manterys, Cracow (PL)

(73) Assignee: APTIV MANUFACTURING MANAGEMENT SERVICES GMBH, Schaffhausen (CH)

( * ) Notice: Subject to any disclaimer, the term of this patent is extended or adjusted under 35 U.S.C. 154(b) by 86 days.

(21) Appl. No.: 18/434,188

(22) Filed: Feb. 6, 2024

(65) Prior Publication Data

US 2024/0275147 A1     Aug. 15, 2024

(30) Foreign Application Priority Data

Feb. 14, 2023    (EP) ..................................... 23156556

(51) Int. Cl.
  *H02G 3/04*        (2006.01)
  *H01B 7/00*        (2006.01)
(52) U.S. Cl.
  CPC ......... *H02G 3/0487* (2013.01); *H01B 7/0045* (2013.01); *H02G 3/0481* (2013.01)
(58) Field of Classification Search
  CPC .............. B60R 16/0215; H02G 3/0462; H02G 3/0487; H02G 3/0406; H02G 3/0481; H01B 7/0045

USPC ......................................................... 174/68.3
See application file for complete search history.

(56) References Cited

U.S. PATENT DOCUMENTS

| | | | | |
|---|---|---|---|---|
| 3,487,574 A | * | 1/1970 | Loof ...................... | H01B 7/368 138/104 |
| 3,534,777 A | * | 10/1970 | Loof ..................... | G09F 3/0295 138/104 |
| 7,347,015 B2 | * | 3/2008 | Keeb ..................... | H01R 9/2475 138/104 |
| 11,204,109 B2 | * | 12/2021 | Vaccaro ................... | H02G 3/32 |

(Continued)

FOREIGN PATENT DOCUMENTS

| | | |
|---|---|---|
| CN | 105485472 A | 4/2016 |
| EP | 1670111 A1 | 6/2006 |
| WO | 2015093613 A1 | 6/2015 |

OTHER PUBLICATIONS

Extended European Search Report for Application No. 23156556.5; European Patent Office; mailed Jul. 13, 2023; 9 pages.

*Primary Examiner* — Timothy J Thompson
*Assistant Examiner* — Michael F McAllister
(74) *Attorney, Agent, or Firm* — Billion & Armitage

(57)     ABSTRACT

The present disclosure relates to cable sleeve for receiving one or more cables, such as a harness for a vehicle. The sleeve includes a sleeve body having a portion made of deformable material. The portion is designed to have a first configuration, which is predefined, and to adopt a second configuration. In the first configuration the cross-sectional area of the portion is smaller than in the second configuration. Additionally, In the first configuration the perimeter length of the cross-sectional area is larger than or equal to the second configuration.

16 Claims, 5 Drawing Sheets

(56) References Cited

U.S. PATENT DOCUMENTS

| 2015/0114710 A1* | 4/2015 | Crounse | .................. | H02G 3/32 |
| | | | | 174/72 A |
| 2020/0099203 A1 | 3/2020 | Pabst et al. | | |
| 2020/0331413 A1 | 10/2020 | Fujioka | | |

* cited by examiner

CABLE SLEEVE COMPRISING A DEFORMABLE PORTION WITH VARIABLE CROSS-SECTIONAL AREA

CROSS-REFERENCE TO RELATED APPLICATION

This application claims the benefit of and priority to European Patent Application No. 23156556.5 titled "Cable Sleeve" filed on Feb. 14, 2023, the contents of which are incorporated by reference herein.

TECHNICAL FIELD

The present disclosure generally relates to a cable sleeve for receiving cables, such as a harness for a vehicle. Particularly the present disclosure relates to a cable sleeve wherein a portion can adopt a first and a second configuration so as to facilitate receiving the respective cables without stretching the material.

BACKGROUND

In recent years the automotive sector has been facing a shift towards electric vehicles, such as cars. This is accompanied by an increasing number of electrical and electronic devices that need to be connected, which results in a rapid increase of electric cables and/or harnesses to facilitate provision of electrical connection. This increase of electric cables leads to an increased space occupied by them. Grommets are usually employed to guide electric cables through them and to protect them from potential environmental impacts. The varying space occupied by cables, which can depend on the number and thicknesses of the cables, calls for improved means to receive and accommodate the cables.

Some attempts have been made, particularly in the automotive industry, to address this. One example is a grommet having a cross-sectional area (seen perpendicularly to the longitudinal direction of the grommet) with a circular. If thicker cables or cables with larger connectors, which occupy more space, are guided through the grommet, a grommet is usually manufactured with a greater cross-sectional area to accommodate the cables or harnesses. The grommet is typically made of rubber, to facilitate stretching the cross-sectional area. This allows to guide cables or harnesses through them with a greater space requirement by stretching them.

However, such an example of a known implementation has several drawbacks. One drawback is that in order to increase the grommet's cross-sectional shape the material needs to be stretched, which results in increased stresses of the material. assembling affects the integrity of the grommet and makes it susceptible to breakage during assembling with cables with relatively large connectors. Moreover, there is a limitation to the extent to which the cross-sectional area can be increased. A further disadvantage of such a known implementation is that the grommet occupies a relatively large space even after assembling with the cables. This is disadvantageous, particularly in the automotive sector, which is dictated by harsh space restrictions. Further, the cables are not positioned centrally within the grommet.

In view of the foregoing, there is a need to improve grommets. It is thus an object of the present disclosure to overcome some or all of the deficiencies of the prior art. In particular, it is an object of the disclosure to provide an improved cable sleeve, which allows to receive and guide harnesses independent of their size. Further, the cable sleeve should only occupy as much space as necessary. Moreover, it is an object to provide a respective method for assembling a cable sleeve with cables.

SUMMARY

A cable sleeve sleeve includes a sleeve body including a portion made of deformable material. The portion is designed to have a first configuration, which is predefined, and to adopt a second configuration. In the first configuration the cross-sectional area of the portion is smaller than in the second configuration. In the first configuration the perimeter length of the cross-sectional area is larger than or equal to the second configuration.

In this manner, the present disclosure provides a cable sleeve, wherein a cross-sectional area can be increased without substantially stretching the deformable material. In particular, this advantage may result from the cross-sectional area of the second configuration being larger while the perimeter length of the cross-sectional area in the second configuration is smaller than in the first configuration.

Thereby, the material is not substantially exposed to mechanical forces, whilst ensuring that relatively large harnesses and/or cables with relatively large connectors can be received within and guided through the cable sleeve.

Further, the durability of the cable sleeve can thereby be improved, and the cable sleeve is less prone to breakage, e.g. during assembling. Hence, less failure of the cable sleeve during ordinary use is to be expected. This is particularly advantageous in the automotive sector.

Another advantage is that a substantially central positioning of harnesses and/or cables can be obtained within the cable sleeve. That is, because the first configuration has a smaller cross-sectional area.

Further, the cable sleeve may only occupy as much space as necessary in the first configuration. That is because the cable sleeve usually has the first configuration once cables are assembled. The second configuration may be temporarily adopted for assembling. Compared to cable sleeves of the prior art, which do not allow for such a first configuration, the present disclosure provides a significant improvement. Further, when increasing the cross-sectional area of grommets of the prior art, the material is subjected to increased mechanical stresses and prone to failure. Moreover, prior art grommets remain in a configuration after assembling with cables, which occupies a relatively large space.

The cable sleeve of the present disclosure may even facilitate increasing the cross-sectional area by stretching the portion to a third configuration, if desired. Thus, a greater cross-sectional area can be provided. Typically, this may not be necessary, as the cross-sectional area of the second configuration already provides sufficient space for cables with relatively large connectors to be guided through it.

The "portion" that is included by the sleeve body may be understood as a portion of any length in the receiving direction of the cable sleeve. The portion may be as long as the sleeve body, or it may be shorter. In particular, a rather short length of the portion may already be sufficient for the above-mentioned advantages to be applicable.

The receiving direction may be the direction in which one or more cables can be received in the cable sleeve.

The "cross-sectional area" as used herein may be understood as the cross-sectional area of the free passage of the portion of the sleeve body. The definition of such an area is generally known to the skilled person. For instance, the cross-sectional may be the area of the cross-section that is substantially perpendicular to the receiving direction. The free passage of the portion may also be understood as a hollow space or lumen. As an illustrative example, the cross-sectional area may be defined by a side of the portion facing the free passage in the plane of the cross-section of the receiving direction.

The term "predefined" may be understood so as to provide a certain configuration, which may be predictable to some extent. For instance, releasing an external force as described herein may a trigger that the portion has the first (predefined) configuration (again).

The deformable material may include rubber or the like. Typically, the adoption of the second configuration may be triggered by applying an external force. However, the force required may be smaller compared to a force required for a portion including relatively rigid material, such as metal.

In one example, the cable sleeve may be a grommet or a part of a grommet. Further, the cable sleeve can be applied in various environments and field of applications. That is, because the portion may be easily deformed and arranged so as to align with the environment. The cable sleeve may be particularly useful in engineering sectors, such as the automotive sector (e.g. in a vehicle).

In a preferred embodiment, in the first configuration, the cross-sectional area has a non-circular and non-rectangular shape. Optionally, in the second configuration, the cross-sectional area has an essentially circular shape.

This has the advantage that the cross-sectional area is rather small compared to the perimeter length in the first configuration. Thereby, space may be saved if it is not needed. Typically, once the cable sleeve is assembled with cables having connectors, the space occupied should be small. The cable sleeve according to the present disclosure facilitates this.

In the second configuration, it is advantageous that the cross-sectional area is rather large compared to the perimeter length. Thereby, cables with connectors that are larger can be received in an improved manner.

The non-circular shape may be any shape, which is not substantially circular. The non-rectangular shape may be any shape, which is not substantially rectangular. As described herein, the shape may include circular sections along its perimeter, however, the overall shape may be non-circular. It may be possible that the shape has one or more sharp edges, and/or that the shape includes any known shapes that are not circular.

Preferably, the first configuration is retained as long as substantially no external force acts on the portion, wherein the second configuration is adopted as long as an external force acts on the portion. Hence, the first configuration may be understood as a shape retaining configuration. This has the advantage that the first configuration allows at least to some extent to maintain its configuration. For instance, the shape of the portion and/or the cross-sectional area of the portion of the first configuration may substantially be the same even if the second configuration is adopted several times.

In case an external force acts on the portion, the second configuration may be adopted. Such external force may be provided for instance by one or more expander. It is appreciated that such a configuration is merely adopted during assembling of the cable sleeve with one or more cables having connectors. Once assembled. The external force may be released such that the portion has its first configuration again, which is maintained substantially for a time span. In one example, said time span may be the service lifetime of the cable sleeve.

Preferably, the perimeter length of the cross-sectional area is substantially the same in the first configuration and the second configuration. This has the advantage that the material is not substantially stretched while the cross-sectional area is increased (e.g. from the first configuration to the second configuration).

In a preferred embodiment, in the first configuration the perimeter of the cross-sectional area includes one or more convex sections and one or more concave sections, as seen from the outside of the perimeter of the cross-sectional area. This has the advantage that convex and concave sections are substantially rounded. In this manner, handling of the cable sleeve may be facilitated.

Preferably, the perimeter portions forming the concave sections in the first configuration form the convex sections in the second configuration. This has the advantage that concave sections can be easily triggered to become convex sections in the second other configuration. Hence, the cross-sectional area can be increased while not substantially affecting the perimeter length. Hence, substantially no stresses of the deformable material occur.

In a preferred embodiment, in the first configuration the convex and concave sections are arranged alternatingly along the perimeter. This has the advantage that cables received in the cable sleeve can be positioned centrally in the first configuration. Further, the cable sleeve can be manufactured in a substantially symmetrical manner, which is generally advantageous. Further, using the cable sleeve may be substantially independent on an orientation of said cable sleeve, if it is substantially symmetrically.

In a preferred embodiment of the cable sleeve, in the first configuration the ratio of a distance $d_{concave}$ from the center point of the cross-sectional area to an innermost point of a concave section and a distance $d_{convex}$ from the center point of the cross-sectional area to an outermost point of a convex section, $d_{concave}/d_{convex}$, is at most 0.90, more preferably at most 0.80, more preferably at most 0.70, more preferably at most 0.60, more preferably at most 0.50, more preferably at most 0.40, more preferably at most 0.36, most preferably at most 0.33.

The ratios as defined herein should not be too small, to facilitate improved handling of the cable sleeve. For instance, if the ratio were too small, it would pose difficulties when cables are to be received. Further, the ratio should not be too large to facilitate the beneficial effect of increasing the cross-sectional area when the portion adopts the second configuration. Thus, the disclosure provides an optimal balance of these contradicting requirements according to the values specified in here.

Preferably, in the second configuration the cross-sectional area is at least 120%, preferably at least 140%, more preferably at least 160%, more preferably at least 180%, most preferably at least 200% of the cross-sectional area in the first configuration. This has the advantage that the cross-sectional area can be significantly increased when the second configuration is adopted compared to the first configuration. This aids the assembling of cables with connectors.

It is likewise possible that the cross-sectional area of the second configuration is even greater than the values specified here. This may be subject to the design of the portion in the first configuration.

According to a further preferred embodiment of the cable sleeve, in the first configuration the cross-sectional area resembles the shape of a cloverleaf, preferably the cloverleaf has three, four, five or more leaves, most preferably the cloverleaf has four leaves. This has the advantage that the cross-sectional area corresponds to a natural shape, which may be advantageous for handling thereof. In particular, substantially no sharp edges may adversely affect the assembly.

In a preferred embodiment, the deformable material is a polymer, preferably rubber, such as ethylene-propylene-diene rubber (EPDM). This has the advantage that such material is easy to procure and cost-effective. Hence, manufacturing of the cable sleeve can be improved. Further, it has proven beneficial to use materials which are already accepted in different industrial fields. Preferably, the adoption of the second configuration is established substantially without stretching the deformable material.

As described herein, stretching the deformable material may adversely affect the durability of the material, as stresses can cause mechanical damage.

The disclosure provides an improved solution, which overcomes this disadvantage. In this manner stretching of the deformable material can be substantially avoided according to the present disclosure whilst the cross-sectional area can be increased from the first to the second configuration.

In a preferred embodiment, the portion is configured to be deformed to a third configuration with at least partially stretching the deformable material, wherein in the third configuration the cross-sectional area is at least 220%, preferably at least 250%, more preferably at least 300%, more preferably at least 350%, most preferably at least 400% of the cross-sectional area in the second configuration. This has the advantage that the cable sleeve as described herein can be used—in addition to the first and second configurations—in a third configuration. This third configuration may be formed by stretching the material starting from the second configuration. Thus, if needed, the cable sleeve of the present disclosure may facilitate a further increase of the cross-sectional area.

Thus, a greater cross-sectional area can be provided. This may not be necessary for most applications, as the cross-sectional area of the second configuration already provides sufficient space for cables. Cables with relatively large connectors may, however, be more easily assembled in this manner.

It is possible that in the third configuration the deformable material has a stress that is higher than the stress of the second configuration.

It is noted that the terminology "first", "second" (and "third") is not to be construed in any limiting manner. Rather, this terminology merely serves the purpose of explaining the underlying inventive concept in the embodiments. Further, it may be feasible that there is an intermediate configuration between the first, second and/or third configuration. It cannot be ruled out for certain that such an intermediate configuration pertains in some examples, as understood by the skilled person.

Further exemplarily embodiments are described in the following:

In a preferred embodiment, in the first configuration, the cross-sectional area includes three convex (preferably as seen from the outside of the perimeter of the cross-sectional area) and three concave (preferably as seen from the outside of the perimeter of the cross-sectional area) sections, preferably arranged alternatingly along the perimeter of the cross-sectional area, wherein the ratio of a distance $d_{concave}$ from the center point of the cross-sectional area to an innermost point of a concave section and a distance $d_{convex}$ from the center point of the cross-sectional area to an outermost point of a convex section, $d_{concave}/d_{convex}$, is between 0.28 and 0.37, preferably between 0.31 and 0.35.

In a preferred embodiment, in the first configuration, the cross-sectional area includes four convex (preferably as seen from the outside of the perimeter of the cross-sectional area) and four concave (preferably as seen from the outside of the perimeter of the cross-sectional area) sections, preferably arranged alternatingly along the perimeter of the cross-sectional area, wherein the ratio of a distance $d_{concave}$ from the center point of the cross-sectional area to an innermost point of a concave section and a distance $d_{convex}$ from the center point of the cross-sectional area to an outermost point of a convex section, $d_{concave}/d_{convex}$, is between 0.44 and 0.52, preferably between 0.46 and 0.50.

In a preferred embodiment, in the first configuration, the cross-sectional area includes five convex (preferably as seen from the outside of the perimeter of the cross-sectional area) and five concave (preferably as seen from the outside of the perimeter of the cross-sectional area) sections, preferably arranged alternatingly along the perimeter of the cross-sectional area, wherein the ratio of a distance $d_{concave}$ from the center point of the cross-sectional area to an innermost point of a concave section and a distance $d_{convex}$ from the center point of the cross-sectional area to an outermost point of a convex section, $d_{concave}/d_{convex}$, is between 0.30 and 0.40, preferably between 0.32 and 0.38.

A further aspect relates to a method for assembling a cable sleeve with cables, the method including providing a cable sleeve as described herein; applying an external force on the portion such that the portion adopts the second configuration; guiding one or more cables, such as a harness for a vehicle, at least partially through the sleeve.

The method facilitates assembling the cable sleeve with cables in an improved manner.

Preferably, the method of the preceding aspect is further including releasing, upon guiding, the applied external force such that the portion has the predefined first configuration; wherein, optionally, applying the external force includes using an expander contacting at least partially one or more concave sections of the perimeter of the cross-sectional area. It is understood that the expander may contact the concave sections in the first configuration. Upon contacting and applying the external force, the concave sections of the first configuration may form convex sections in the second configuration as described herein. This aids in increasing the cross-sectional area and facilitates assembling without stretching the material.

It is noted that the features, aspects, embodiments and/or advantages as described herein with reference to the cable sleeve are likewise applicable to the method for assembling a cable sleeve with cables.

BRIEF DESCRIPTION OF THE DRAWINGS

The present invention is now described, by way of example with reference to the accompanying drawings, in which.

DETAILED DESCRIPTION

Figure 1:
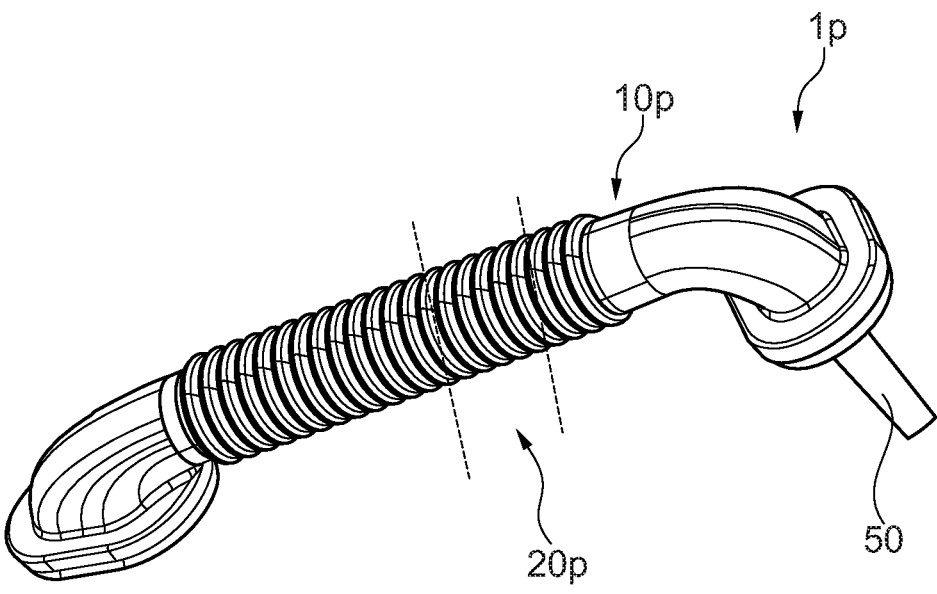
FIG. 1 illustrates an isometric view of grommet with a harness according to the prior art.

The term "convex" is used herein, for instance when referring to a "convex" section of the cross-sectional area, means that a line between any two points on the "convex" section is contained in the cross-cross-sectional area.

The term "concave" is used herein, for instance when referring to a "concave" section of the cross-sectional area, means that a line between any two points on the "convex" section is not contained in the cross-cross-sectional area.

The term "harness" as used herein may also be referred to as a cable harness, wire harness, wiring harness, cable assembly, wiring assembly. The term may be understood as an assembly of electrical cables or wires for transmitting signals or electrical power. The harness may include one or more cables/wires. The cables/wires may be bound together.

The term "stretching" as used herein in the context of the material may refer to an elongation of the material such that the material expands and/or strains. Thereby, a stress in the material is caused. As an illustrative example, if the material were to behave according to a linear elastic stress strain curve, a stress increases in proportion to the strain and vice versa. The term "deformation" as used herein in the context of the material may refer to a variation in shape of the material without substantially causing a stress.

The "free passage" referred to herein could also be understood as a lumen, e.g. the cavity of a tubular organ or part.

In the subsequent passages, the invention is described with reference to the accompanying figures in more detail. It is noted that further embodiments are certainly possible, and the below explanations are provided by way of example only, without limitation. Throughout the present figures and specification, the same reference numerals refer to the same elements. The figures may not be drawn to scale, and the relative size, proportions, and depiction of elements in the figures may be exaggerated for clarity, illustration, and convenience.

Figure 2:
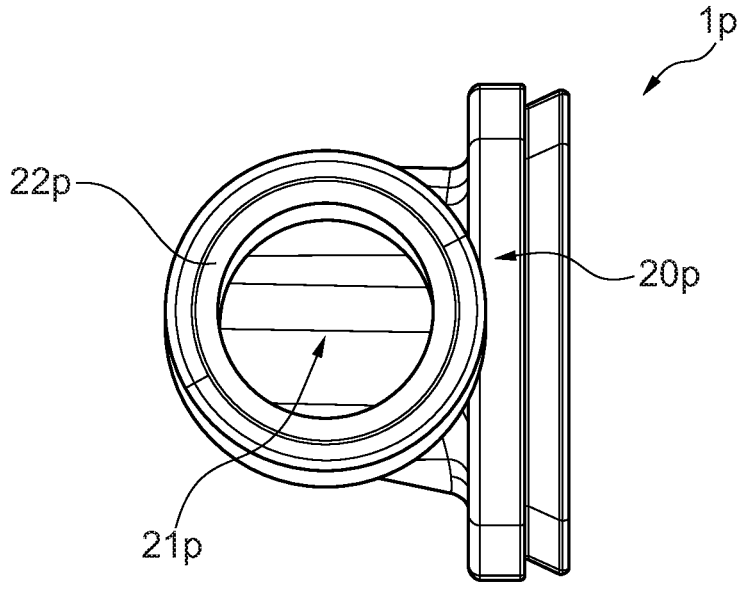
FIG. 2 illustrates front view of a grommet according to the prior art.

FIG. 1 shows an exemplary grommet $1p$ with a harness 50 according to the prior art, in a perspective view. FIG. 2 shows a further exemplary grommet $1p$ according to the prior art, in a frontal view. The grommets $1p$ have a body $10p$ and a portion $20p$ is also indicated. The cross-sectional area $21p$ of the portions $20p$ is circular. Further, it can be seen that another portion of the body $10p$ of the grommet $1p$ in FIG. 1 in proximity to where the harness 50 is received has a substantially rectangular shape.

The portions $20p$ in both figures are designed such that the cross-sectional areas $21p$ of the portions $20p$ are substantially the same in any configuration during ordinary use. Increasing the cross-sectional areas $21p$ requires stretching the material of the portions $20p$. Further still, increasing the cross-sectional areas $21p$ also entails that the perimeters $22p$ (as indicated in FIG. 2) of the cross-sectional areas $21p$ increase.

Figures 3, 4:
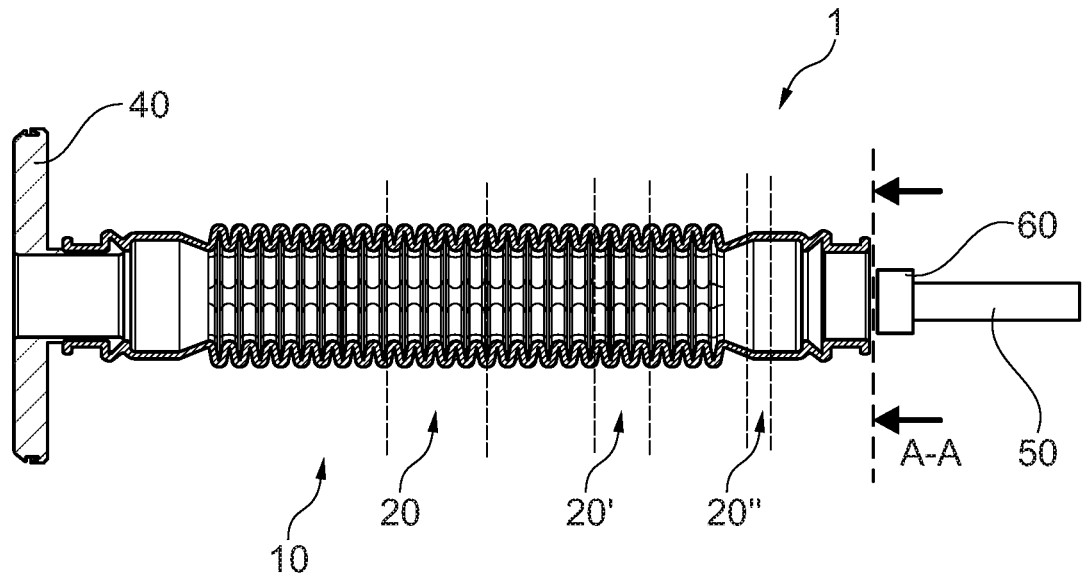
FIG. 3 illustrates cross sectional side view of a cable sleeve according to some embodiments.
FIG. 4 illustrates the cross sectional end view of the cable sleeve FIG. 3 along section line A-A indicated in FIG. 3 according to some embodiments.

FIG. 3 shows a cable sleeve 1 in a side view. The cable sleeve 1 is shown in a cut along its longitudinal direction. The longitudinal direction may be the direction in which a cable, one or more cables and/or a harness 50 can be received. A harness 50 is exemplarily indicated on the right-hand side in FIG. 3.

The cable sleeve 1 includes a sleeve body 10 including a portion 20 made of deformable material. The portion 20 is designed to adopt a first configuration and a second configuration, wherein in the first configuration the cross-sectional area 21 (as best seen in FIG. 4) of the portion 20 is smaller than in the second configuration.

It is noted that the figure indicates several portions 20, 20', 20". In essence, there could be a plurality of portions of the sleeve body 10. A portion 20, 20', 20" could be in proximity to the ends of the body 10 of the cable sleeve 1. A portion 20, 20', 20" could also extend along the overall longitudinal length of the cable sleeve 1.

The deformable material could be a polymer, preferably rubber, such as ethylene-propylene-diene rubber (EPDM).

In one example, the cable sleeve 1 can be referred to as a grommet or a part of a grommet. Further, the cable sleeve 1 can be applied in various environments and field of applications. The cable sleeve 1 may be particularly useful in the automotive sector. For instance, the cable sleeve 1 can be coupled to a part 40 of a vehicle. In this manner, the cable sleeve 1 can facilitate protecting a harness 50 received in the cable sleeve 1 and/or facilitate that a harness 50 can be guided around corners or the like. Thus, the cable sleeve ensures a relatively safe environment for the harness 50.

FIG. 4 shows the embodiment of FIG. 3 in the view A-A indicated in FIG. 3. It is noted that this figure shows the portion 20 in the first configuration. The cross-sectional area 21 and its perimeter 22 is indicated. The cross-sectional area 21 is the area of the free passage of the cable sleeve 1. As mentioned with respect to FIG. 3, the cross-sectional area 21 could be the cross-sectional area 21 of any one of the portions 20, 20', 20" or further portions not explicitly indicated in FIG. 3.

Figures 5A, 5B:
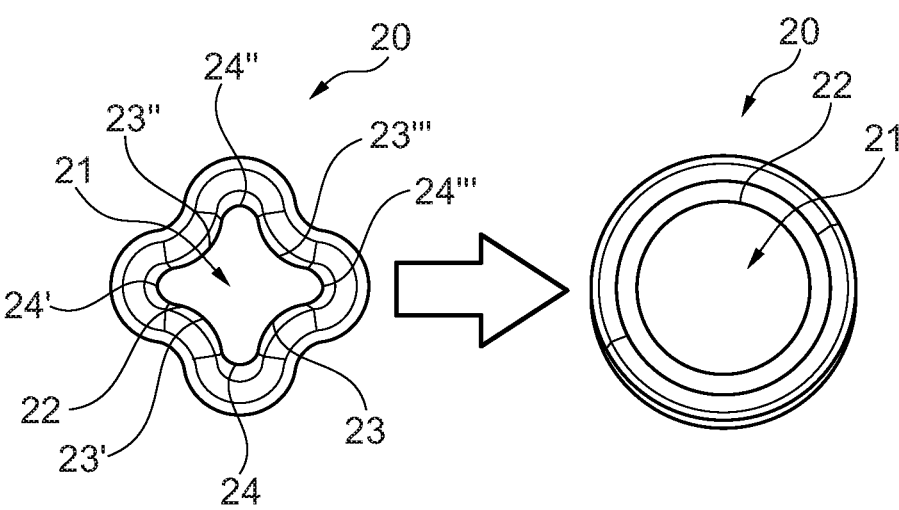
FIG. 5A illustrates a portion of a cable sleeve according to first embodiment.
FIG. 5B illustrates a portion of a cable sleeve according to a second embodiment.

FIGS. 5A and 5B shows a portion 20 of a cable sleeve 1 according to a first configuration shown in FIG. 5A and a second configuration shown in FIG. 5B. The portion 20 can be the portion 20, 20', 20" or any further portion of the embodiment of FIGS. 3 and 4. The adoption of the second configuration is performed by applying an external force from within the cable sleeve 1. The first configuration can be a shape retaining configuration. Furthermore, the first configuration may be retained as long as substantially no external force acts on the portion 20.

As can be seen, in the first configuration, the cross-sectional area 21 has a non-circular and non-rectangular shape. In the second configuration, the cross-sectional area 21 has an essentially circular shape. The perimeter 22 length of the cross-sectional area 21 can be greater in the first configuration compared to the second configuration. In one example, the perimeter 22 length of the cross-sectional area 21 is substantially the same in the first and the second configuration. Minor deviations in the length of the perimeter 22 may be encompassed.

Further still, in the first configuration, the perimeter 22 of the cross-sectional area 21 includes one or more convex sections 24, 24', 24", 24''' and one or more concave sections 23, 23', 23", 23'''. This is to be understood as seen from the outside of the perimeter 22 of the cross-sectional area 21.

Put another way, this is to be understood as seen from the outside the cross-sectional area 21.

Portions of the perimeter 22 that form concave sections 23, 23', 23", 23'" in the first configuration and form the convex sections 24, 24', 24", 24'" in the second configuration. The convex sections are not indicated on the right-hand side in this figure. As understood, the overall perimeter 22 is convex in this embodiment in the second configuration.

In the first configuration shown in FIG. 5A the convex 24, 24', 24", 24'" and concave 23, 23', 23", 23'" sections are arranged alternatingly along the perimeter. Furthermore, the concave 23, 23', 23", 23'" sections are pointing towards the center point 25 of the cross-sectional area 21. Moreover, in the first configuration the cross-sectional area 21 resembles the shape of a cloverleaf, which has in this embodiment four leaves (though any number is possible, one or two leaves may also be possible).

Furthermore, the adoption of the second configuration is triggered by an external force, which could be provided by an expander or the like.

In the second configuration shown if FIG. 5B, the cross-sectional area 21 is at least 120%, preferably at least 200% of the cross-sectional area 21 in the first configuration shown in FIG. 5A.

Further, attributable to the deformable material, the portion 20 can also be configured to be deformed to a third configuration (not shown) with at least partially stretching the deformable material. In the third configuration the cross-sectional area 21 is at least 220%, preferably at least 400% of the cross-sectional area 21 in the second configuration (in some examples this may be based on the first configuration).

Figure 6:
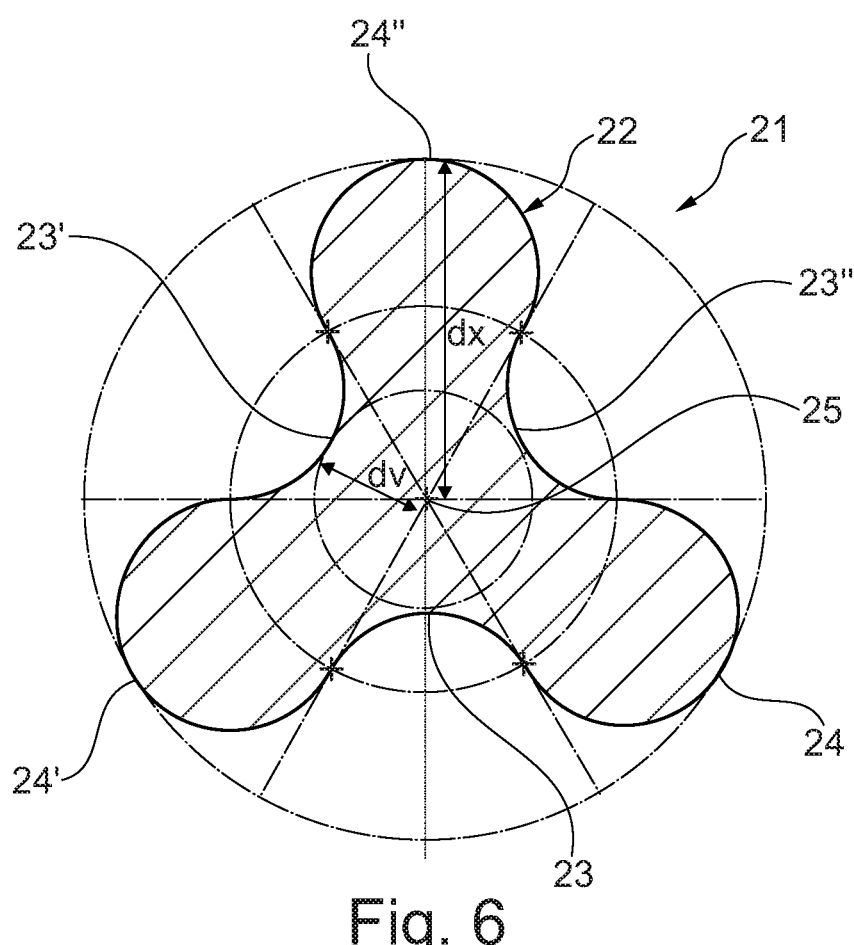
FIG. 6 illustrates a cross-sectional area of a portion of a cable sleeve according to an embodiment with three convex sections according to some embodiments.

FIG. 6 shows a cross-sectional area 21 of a portion 20 of a cable sleeve 1 according to an embodiment with three convex 24, 24', 24" and three concave 23, 23', 23" sections.

Figure 7:
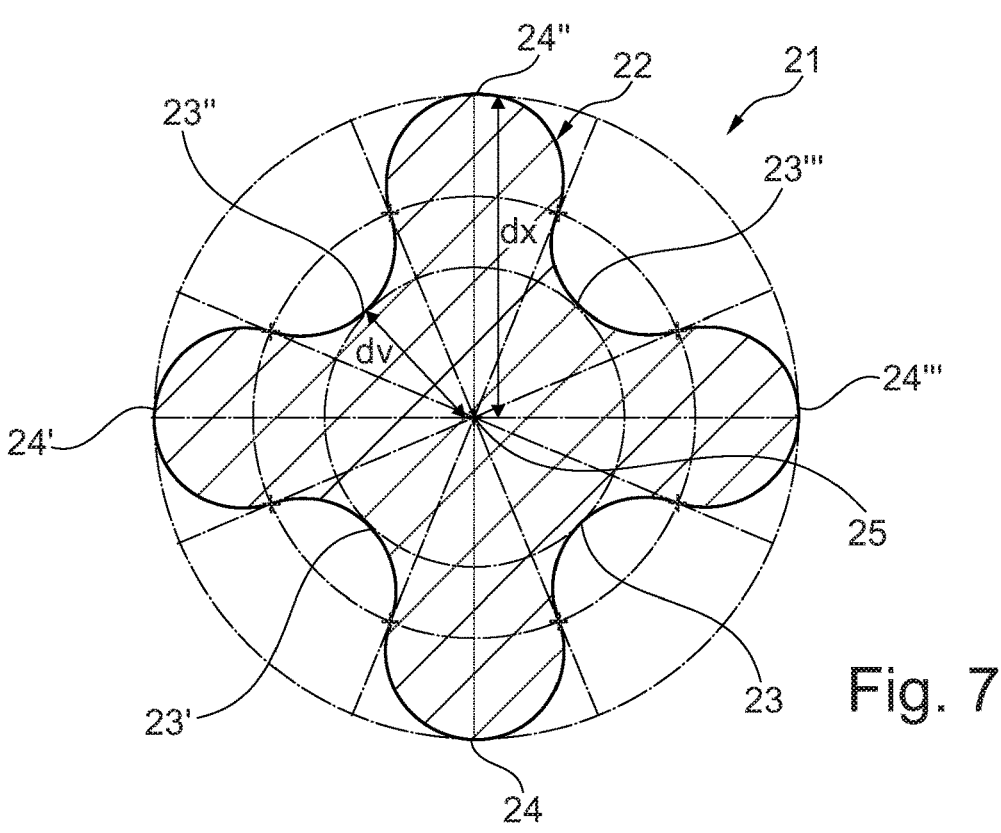
FIG. 7 illustrates a cross-sectional area of a portion of a cable sleeve according to a further embodiment with four convex sections according to some embodiments.

FIG. 7 shows a cross-sectional area 21 of a portion 20 of a cable sleeve 1 according to a further embodiment with four convex 24, 24', 24", 24'" and four concave 23, 23', 23", 23'" sections.

Figure 8:
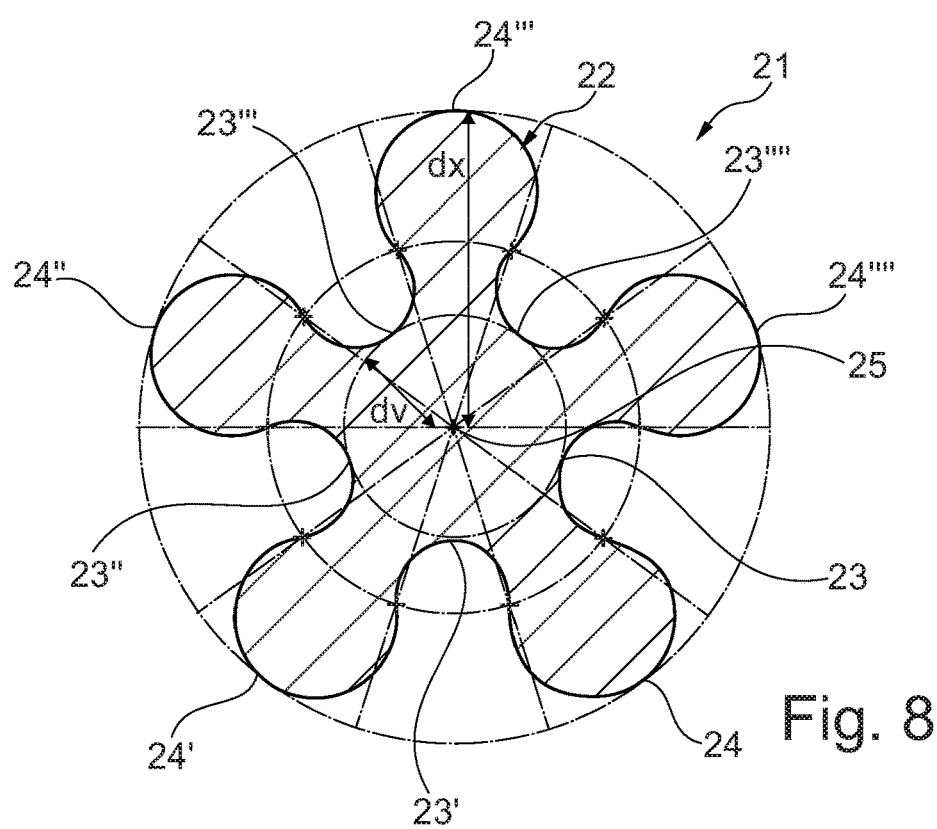
FIG. 8 illustrates a cross-sectional area of a portion of a cable sleeve according to yet a further embodiment with five convex sections according to some embodiments.

FIG. 8 shows a cross-sectional area 21 of a portion 20 of a cable sleeve 1 according to yet a further embodiment with five convex 24, 24', 24", 24'", 24"" and five concave 23, 23', 23", 23'", 23"" sections.

In FIGS. 6 to 8 the cross-sectional areas 21 of the portion 20 of the sleeve body 10 of the cable sleeve 1 are depicted in the first configuration. The dashed outer circumference may indicate the second configuration. Further, the distance $d_{concave}$ (dv) from the center point 25 of the cross-sectional areas 21 to an innermost point of a concave section 23, 23', 23", 23'", 23"" is indicated.

Moreover, the distance $d_{convex}$ (dx) from the center point 25 of the cross-sectional areas 21 to an outermost point of a convex section 24, 24', 24", 24'", 24"" is indicated.

Most preferably the ratio dv/dx is about 0.31 and 0.35 in the embodiment of FIG. 6. Most preferably the ratio dv/dx is about 0.46 and 0.50 in the embodiment of FIG. 7. Most preferably the ratio dv/dx is about 0.32 and 0.38 in the embodiment of FIG. 8.

Figures 9A, 9B, 9C, 9D:
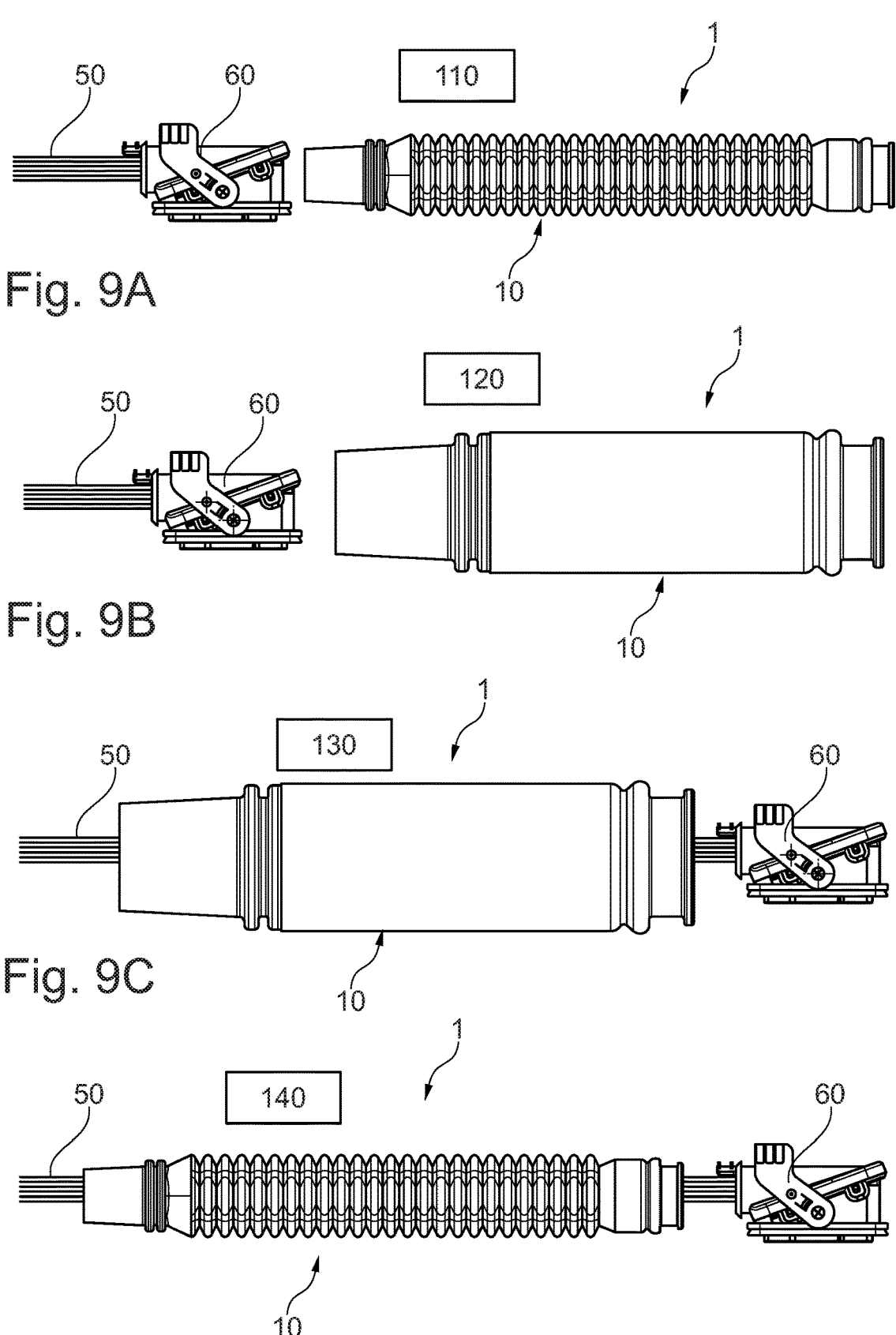
FIGS. 9A-9D illustrate a method for assembling a cable sleeve with cables according to some embodiments.

FIGS. 9A-9D shows a method 100 for assembling a cable sleeve 1 with cables 50. The method 100 includes the steps of providing 110 a cable sleeve 1 as described herein, applying 120 an external force on the portion 20 such that the portion 20 adopts the second configuration. As can be seen in FIGS. 9A and 9B, in the second configuration (see method step 120) the cross-sectional area is relatively large compared to the first configuration (see method step 110). The method 100 further includes guiding 130 one or more cables 50 with a connector 60 at least partially through the sleeve 1. The method 100 further includes releasing 140, upon guiding 130, the applied external force such that the portion 20 has the predefined first configuration. Optionally, applying 120 the external force includes using an expander (not depicted) contacting at least partially one or more concave sections from within the cable sleeve 1.

While this invention has been described in terms of the preferred embodiments thereof, it is not intended to be so limited, but rather only to the extent assembly forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A cable sleeve for receiving one or more cables, such as a harness for a vehicle, the sleeve comprising:
a sleeve body comprising a portion made of deformable material, wherein the portion is designed to have a first configuration, which is predefined, and to adopt a second configuration, wherein a cross-sectional area of the portion is smaller in the first configuration than in the second configuration, wherein a perimeter length of the cross-sectional area in the first configuration is larger than or equal to the second configuration, wherein the cross-sectional area has an essentially circular shape in the second configuration, and wherein in the first configuration the perimeter of the cross-sectional area comprises one or more convex sections and one or more concave sections, as seen from outside of the perimeter of the cross-sectional area.

2. The sleeve according to claim 1, wherein the cross-sectional area has a non-circular and non-rectangular shape in the first configuration.

3. The sleeve according to claim 1, wherein the first configuration is retained as long as substantially no external force acts on the portion and wherein the second configuration is adopted as long as an external force acts on the portion.

4. The sleeve according to claim 1, wherein the perimeter length of the cross-sectional area is substantially the same in the first and the second configuration.

5. The sleeve according to claim 1, wherein the perimeter portions forming the concave sections in the first configuration form the convex sections in the second configuration.

6. The sleeve according to claim 1, wherein in the first configuration the convex and concave sections are arranged alternatingly along the perimeter.

7. The sleeve according to claim 1, wherein in the first configuration a ratio of a distance $d_{concave}$ from a center point of the cross-sectional area to an innermost point of a concave section and a distance $d_{convex}$ from the center point of the cross-sectional area to an outermost point of a convex section, $d_{concave}/d_{convex}$, is at most 0.90.

8. The sleeve according to claim 1, wherein in the second configuration the cross-sectional area is at least 120% of the cross-sectional area in the first configuration.

9. The sleeve according to claim 1, wherein the cross-sectional area has a cloverleaf shape in the first configuration.

10. The sleeve according to claim 1, wherein the deformable material is a polymer.

11. The sleeve according to claim 10, wherein the polymer is a rubber material.

12. The sleeve according to claim 11, wherein the rubber material is ethylene-propylene-diene rubber (EPDM).

13. The sleeve according to claim 1, wherein the adoption of the second configuration is established substantially without stretching the deformable material.

14. The sleeve according to claim 1, wherein the portion is configured to be deformed to a third configuration with at least partially stretching the deformable material and, wherein in the third configuration the cross-sectional area is at least 220% of the cross-sectional area in the second configuration.

15. A method for assembling a cable sleeve with cables, comprising:
providing a cable sleeve including a sleeve body having a portion made of deformable material, wherein the portion is designed to have a first configuration, which is predefined, and to adopt a second configuration, wherein a cross-sectional area of the portion is smaller in the first configuration than in the second configuration, and wherein a perimeter length of the cross-sectional area in the first configuration is larger than or equal to the second configuration, wherein the cross-sectional area has an essentially circular shape in the second configuration;
applying an external force on the portion such that the portion adopts the second configuration; and
guiding one or more cables for a vehicle at least partially through the sleeve, wherein in the first configuration the perimeter of the cross-sectional area comprises one or more convex sections and one or more concave sections, as seen from outside of the perimeter of the cross-sectional area.

16. A method for assembling a cable sleeve with cables, comprising:
providing a cable sleeve including a sleeve body having a portion made of deformable material, wherein the portion is designed to have a first configuration, which is predefined, and to adopt a second configuration, wherein a cross-sectional area of the portion is smaller in the first configuration than in the second configuration, and wherein a perimeter length of the cross-sectional area in the first configuration is larger than or equal to the second configuration, wherein the cross-sectional area has an essentially circular shape in the second configuration;
applying an external force on the portion such that the portion adopts the second configuration;
guiding one or more cables, such as a harness for a vehicle, at least partially through the sleeve; and
releasing, after guiding one or more cables, such as a harness for a vehicle, at least partially through the sleeve, the applied external force such that the portion has the predefined first configuration, wherein applying the external force comprises using an expander contacting at least partially one or more concave sections of the perimeter of the cross-sectional area.

* * * * *